(12) United States Patent
Amin et al.

(10) Patent No.: US 6,373,931 B1
(45) Date of Patent: *Apr. 16, 2002

(54) METHOD FOR ALLOWING A CALLED PARTY TO ALLOCATE CALL PAYMENT RESPONSIBILITY

(75) Inventors: Umesh J. Amin; Michael Buhrmann, both of Redmond, WA (US)

(73) Assignee: AT&T Wireless Services, Inc., Redmond, WA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/974,394

(22) Filed: Nov. 19, 1997

(51) Int. Cl.[7] .............................................. H04M 15/00
(52) U.S. Cl. .............................. 379/121.01; 379/112.01; 379/114.1; 379/115.01; 455/406
(58) Field of Search ................................ 379/112, 114, 379/115, 120, 121, 127, 144, 112.01, 114.1, 114.12, 115.01–115.02, 121.01–121.02, 127.01–127.06, 114.01, 144.02; 455/407, 406, 405, 408

(56) References Cited

U.S. PATENT DOCUMENTS

| | | | |
|---|---|---|---|
| 4,726,056 A | | 2/1988 | An et al. |
| 5,287,269 A | | 2/1994 | Dorrough et al. |
| 5,351,286 A | | 9/1994 | Niel |
| 5,381,467 A | | 1/1995 | Rosinski et al. |
| 5,425,083 A | | 6/1995 | Furuya et al. |
| 5,473,671 A | * | 12/1995 | Partridge, III ............... 455/408 |
| 5,557,664 A | | 9/1996 | Burns et al. |
| 5,646,984 A | * | 7/1997 | Oda ............................ 379/121 |
| 5,722,067 A | * | 2/1998 | Fougnies et al. ............ 455/406 |
| 5,754,633 A | * | 5/1998 | Levy ............................ 379/144 |
| 5,774,869 A | * | 6/1998 | Toader ......................... 705/10 |
| 5,822,411 A | * | 10/1998 | Swale et al. ................. 379/114 |
| 5,825,863 A | * | 10/1998 | Walker ......................... 379/144 |
| 5,850,599 A | * | 12/1998 | Seiderman ................... 455/408 |
| 5,854,975 A | * | 12/1998 | Fougnies et al. |
| 6,115,602 A | * | 9/2000 | Dee et al. |

* cited by examiner

Primary Examiner—Duc Nguyen
(74) Attorney, Agent, or Firm—Kenyon & Kenyon

(57) ABSTRACT

A method provides a wireless subscriber with the capability of selectively changing the assignment of the party that pays for a call for which the wireless subscriber is terminating terminal. The subscriber can register with a switching center and select an option that places the payment responsibility on a calling party. Then when a calling party initiates a call to the wireless subscriber the switching center forwards a notice to the calling party that the responsibility for paying for the call rests with the calling party. The wireless subscriber can at any subsequent time elect to accept the responsibility for calls to the subscriber.

8 Claims, 2 Drawing Sheets

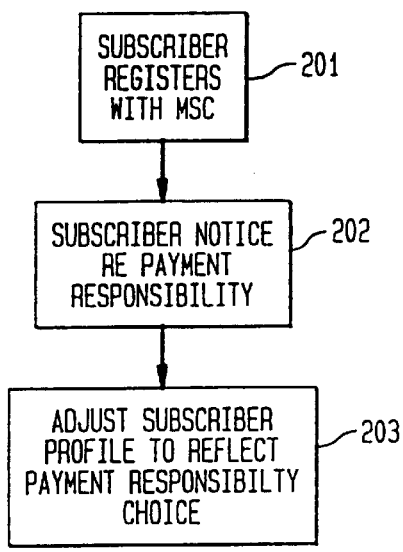
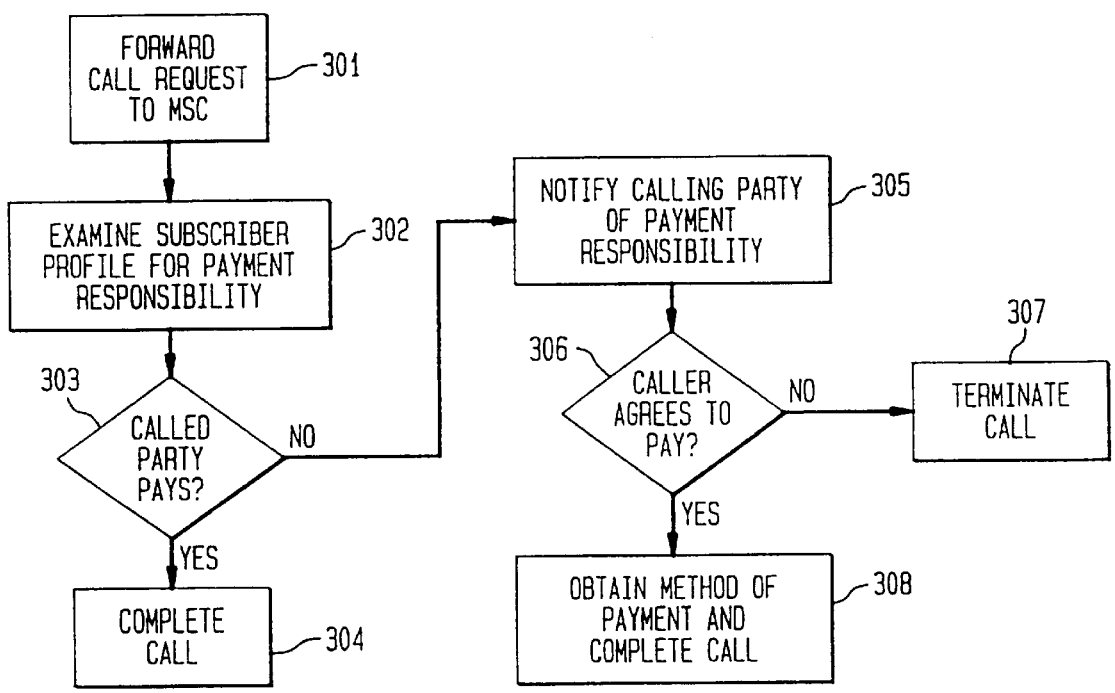

METHOD FOR ALLOWING A CALLED
PARTY TO ALLOCATE CALL PAYMENT
RESPONSIBILITY

BACKGROUND OF THE INVENTION

The present invention is directed to a method for allowing a called party to designate that a calling party shall pay for a call. More particularly, the present invention provides, in the wireless environment, that a subscriber with a mobile station can adjust a subscriber profile so that a calling party must agree to pay for a call to the subscriber before the call will be completed.

In today's wireless communication environment, it is customary practice for the wireless subscriber or mobile station subscriber to assume payment responsibility for air time charges for calls involving a subscriber station regardless of whether the call originates from the station or originates from some other location and terminates at the station. However, this customary practice may be disadvantageous to the mobile station subscriber. The subscriber under these circumstances is forced to pay for calls which they do not wish to receive. For instance, the subscriber may receive solicitation telephone calls. Upon answering such a call the subscriber will be charged with a connection fee and possibly some minimum air time fee even if the call does not proceed to any great extent. It is therefore desirable to provide the called party with some opportunity to select whether it wishes to pay for calls to the mobile station.

It is already known in the art, for example U.S. Pat. No. 5,381,467 to allow a called party to share toll charges which are normally paid by the calling party in the land line environment. However, there is no suggestion in this patent of any solution to the "called-party-pays" dilemma faced in the wireless environment.

SUMMARY OF THE INVENTION

The present invention provides a wireless subscriber with the capability of designating that a calling party shall be responsible for paying the charges associated with a call to the wireless station.

In accordance with the present invention, the wireless or mobile station subscriber, during an activation or registration period, generates a request to adjust the payment responsibility allocation. The request is sent to a switching center associated with a base station with which the mobile station wirelessly communicates. The switching center then revises a subscriber profile to indicate, for instance, the subscriber has designated that the calling party shall be responsible for paying the costs for the call. The request can be made using codes transmitted over a control channel, where the codes are created at the mobile station using a keypad of the device. At a later time the subscriber can, in another registration process, again change the payment responsibility allocation to designate the called party as the party responsible for payment.

When a calling party initiates a call to the mobile unit, a query is passed to the database that contains the subscriber profile for the mobile unit. The switching center determines which party is responsible for paying for the call in accordance with the subscriber's profile. If the called party is to pay, then a call can simply be processed as it normally would. If, however, the subscriber has adjusted the profile to indicate that the calling party must pay, then the switching center sends a notice to the local exchange for the calling party. The calling party is then notified that before the call will be completed they must accept responsibility for payment for the call. If the calling party agrees to accept payment, either by a voice response or activation of certain keys on the calling party keypad, then the call is processed and completed.

BRIEF DESCRIPTION OF THE DRAWINGS

FIG. 2 illustrates a flow of a process for adjusting a payment responsibility allocation in accordance with an embodiment of the present invention.

FIG. 3 is a flow diagram indicating a process for completing a call where a called party has the ability to select which party has payment responsibility.

DETAILED DESCRIPTION

Figure 1:
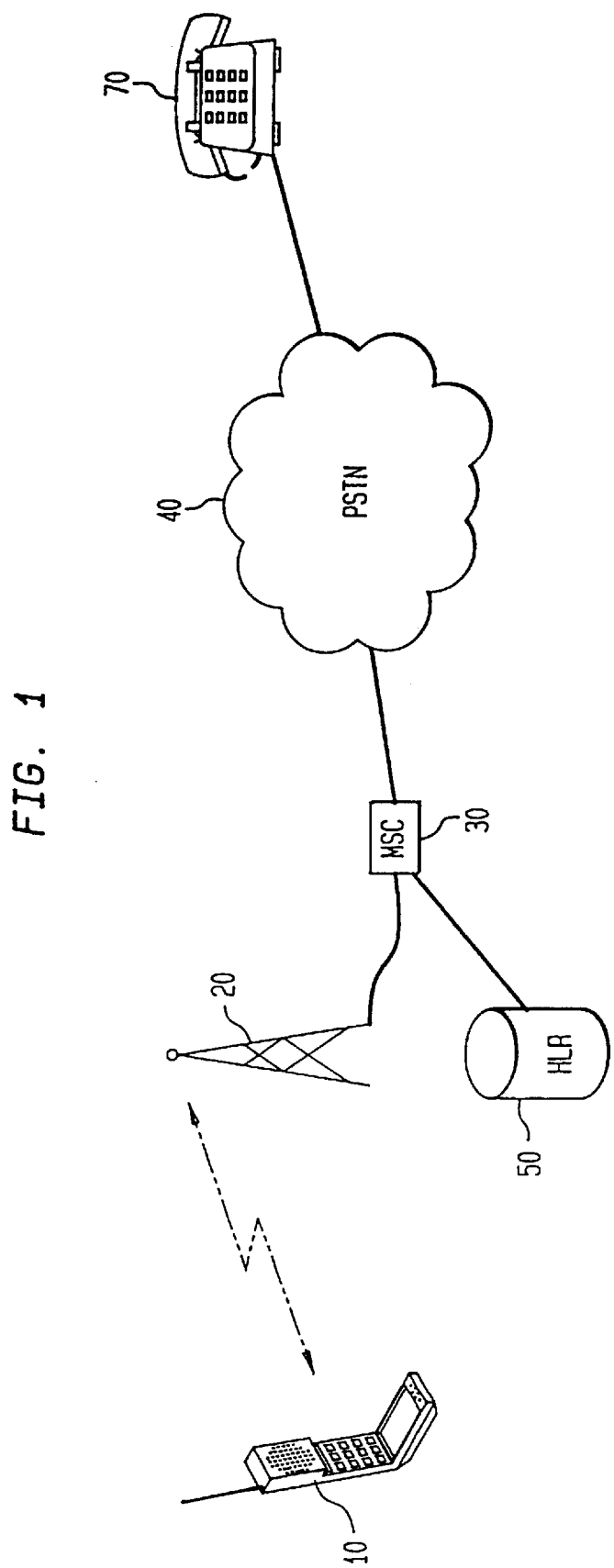
FIG. 1 illustrates a basic system in which the present invention may be employed.

FIG. 1 illustrates a communication system in which a method of the present invention can be employed. In that system a mobile station (MS) 10 is operated by a subscriber. The mobile station wirelessly communicates with a base station (BS) 20. The base station is connected to a mobile switching center (MSC) 30. The MSC provides access to the public switched telephone (PSTN) network 40. The MSC is also coupled to a home location register (HLR) 50 which constitutes a database containing information about the mobile unit subscribers for the wireless service provider that operates the MSC. In a typical operation where a call from a telephone 70 is directed to mobile station 10, the PSTN directs the call, based on the called number, to the mobile switching center 30. The MSC then accesses the HLR to determine a subscriber profile associated with the mobile station 10 and that profile also includes the information that identified the base station with which the mobile station was last registered. Using this information, the MSC can complete the call to the mobile station via the base station 20 with which the mobile station 10 is registered. The subscriber also may roam outside of her home service area. In such an instance the subscriber profile information can be transferred from the HLR to a visitor location register (VLR) associated with the service area in which the subscriber is roaming. Thus, the profile may be found in the HLR and the VLR. The remainder of the description will refer to the HLR for purposes of simplicity although the VLR deployment is considered within the scope of this invention.

In accordance with an embodiment of the present invention, the subscriber of the mobile station can alter the subscriber profile so as to designate the calling party as the person responsible for paying for a call to the subscriber.

FIG. 2 illustrates a process flow for permitting the subscriber to designate the party that is responsible for paying for the call. In step 201 the subscriber registers with the mobile switching center. In step 202 the subscriber notifies the MSC of an intent to change payment responsibility, that is, the subscriber sends some code, possibly in response to menu options provided by the switching center, that indicates that the subscriber wishes to change the payment responsibility for calls directed to the mobile station. The codes or requests can be generated using the keypad of the mobile unit in a known fashion or can simply be voice responses to prompts generated by the mobile switching center. Voice recognition technology and voice response technology are both well known in the art. Once the subscriber has indicated a desire to change the allocation of payment responsibilities, then the MSC resets a subscriber profile in the HLR, step 203. In this instance the HLR could contain a table of information with a plurality of information fields being provided for each subscriber. Such information fields could correlate such information as a mobile identification number (MIN), an electronic serial number (ESN) associated with the station, subscriber name, subscriber address, etc. One of the information fields could be dedicated to act as a flag for identifying whether the subscriber desires that the calling party pay for calls (also referred to herein as the Calling-Party-Pays flag). This could be as simple as having a one bit representation in a table: a "0" representation indicates that the called party accepts responsibility for payment and a "1" representation indicates that the called party desires that the calling party pay for the call. Other subscriber profile constructions and formats for indicating payment responsibility are possible. Also, it is possible that the wireless service provider will provide, as a default setting, that the called party will be responsible for payment. Thus, if the subscriber does not take some active measure to change payment responsibility then the profile will by default indicate that the subscriber has agreed to accept payment responsibility.

FIG. 3 illustrates a call processing flow taking into account the selectability of the payment responsibility as provided by the process of FIG. 2 above. In particular, the process of FIG. 3 describes the process of a call originating at, for example, telephone 70 of FIG. 1 and which is directed to mobile station 10 of the same figure. In that circumstance, the call begins at a local exchange associated with the telephone 70. The local exchange is a part of the PSTN 40. The local exchange forwards, via the PSTN, a call request to the subscriber's MSC 30 using the dialed number which corresponds to the mobile identification number of the mobile station 10 (step 301). The MSC, using the MIN examines the subscriber profile (step 302). In particular, the MSC determines based on the subscriber profile whether the called party pays based on the status of the payment responsibility flag or-Calling-Party-Pays flag (step 303). If the subscriber profile indicates that the subscriber agrees to pay for calls directed to the mobile station then the call is completed in the same manner as a normal call to a wireless unit would be completed as described above with respect to the description of FIG. 1 (step 304). If, however, the subscriber does not agree to pay, that is the subscriber profile indicates a desire that the calling party pay, then a notice must be passed on to the calling party that the call will only be completed if the calling party agrees to pay (step 305). This notice can be generated in any number of ways. For instance, the MSC may forward a notice to the local exchange that the caller or calling party must pay for the call. The local exchange could then transmit to the calling party a message that indicates that the calling party must agree to pay for the call before the call will be completed. Alternatively, the message could be transmitted from the wireless network and merely passed through the local exchange to the calling party. Once the notice has been received, the caller can either agree to pay or decide not to pay (step 306). The caller's response can be provided either by activation of keys on the telephone keypad or by voice response to prompts provided as part of the notice that the caller must pay. If the caller does not agree to pay for the call, the call is terminated (step 307). If the caller does agree to pay then the call to the mobile unit can be completed and the network asks for the method of payment and keeps track of the fact that the calling party is to be billed for the call (step 308).

Once it is determined that the calling party must pay, some technique must be available to charge the calling party.

One technique would be to bill the account associated with the calling party's telephone number. This is similar to how toll calls are charged to customers or subscribers making telephone calls from their premises.

An alternative technique would be to allow the calling party to charge the air time related to the call to a calling card, e.g., a credit card or AT&T calling card. In that circumstance, upon detection of the calling-party pays condition the calling party would be asked to accept billing responsibility for the air time. If the calling party agrees the caller should be temporarily transferred to a separate network platform that deals with calling card processing. Upon completion of the operation of establishing billing responsibility the network platform would take the steps necessary to try to have the call to the mobile station completed.

In yet another alternative technique the calling party could use a pre-paid calling card to handle billing. In this circumstance the calling party would indicate their preference for payment and the call control could, at least temporarily, be transferred to a pre-paid calling card processor. That processor would be programmed to deduct the appropriate amounts for the air time connection to the mobile station. In addition, the processor could be programmed to deduct a premium on behalf of the called party. For example, the called party could be a person or group of persons rendering consumer or business services. The charge rate for air time could be adjusted to incorporate a surcharge for contacting the service provider over their mobile station where such contact should be limited to emergency situations. Thus, the pre-paid calling card processor would, based on subscriber information, set a charge rate for connecting the calling party to the called party's mobile station. Then once the call is put through to the mobile station the processor would begin to debit the calling party's account.

Selection of billing alternatives can be handled by an Integrated Voice Response (IVR) Unit and/or a voice recognition unit (VRU) whereby the calling party can be provided with one or more menu options for payment once it is detected that the calling party is to be responsible for payment.

By implementing the above described invention the called party has the capability of dynamically toggling a calling party's obligation to pay for a call. This dynamic toggling capability can be made even more flexible. For example, it is possible that the subscriber profile could store information regarding calling party identification so that the subscriber could select that certain calling parties shall bear the responsibility for payment while other calling parties will not. For example, the subscriber may decide to pay for all calls originating from certain numbers. The subscriber profile would contain a list of calling party numbers corresponding to those numbers as kind of an exceptions list. The subscriber could then designate that calls originating from other numbers must be paid for by the calling party. Then during a call, if the Calling-Party-Pays flag is set then the MSC will compare the received Call Party ID information to the numbers stored in the exceptions list. If a match is found the called party will pay. If no match is found then the calling party is notified about payment responsibility as described above.

It is also possible that the designation of which party pays could be varied X over time automatically, that is the subscriber could elect certain times of the day in which all parties could be responsible for paying for calls to the subscriber whereas other times of the day the called party will accept responsibility for the calls. This information would also be contained in the subscriber profile.

In yet another variation, the system may provide the capability of an emergency override. In particular, if the called party has asserted that the calling party must pay and the calling party must make emergency contact with the subscriber but does not have the capability to agree to payment, then the system may provide the calling party with the capability of entering a code to designate the call as an emergency call. It might further require that the calling party provide some password which could be checked against an additional emergency access information field in the subscriber profile. If the code matches then the system could override the calling party pays designation and complete the call having the called party pay.

By providing a subscriber to a mobile communication network with the capability of adjusting their subscriber profile to designate a party to pay for calls directed to the mobile subscriber, the present invention enhances the flexibility of allocating the expensive air time for calls involving the mobile station.

What is claimed is:

1. A method for performing wireless communication over a wireless network having a mobile switching center, the method including:

receiving a call from a calling party at the mobile switching center, the call being directed to a mobile station subscriber having a subscriber profile accessible by the mobile switching center;

determining a time of day of the call; and determining, from the subscriber profile and the time of day of the call, whether one of the calling party and the called party is designated to pay for the call.

2. An apparatus for performing wireless communication over a wireless network having a mobile switching center, the apparatus comprising:

a processor; and a memory storing instructions adapted to be executed by the processor; the instructions including:

receiving a call from a calling party at the mobile switching center, the call being directed to a mobile station subscriber having a subscriber profile accessible by the mobile switching center;

determining, a time of day of the call; and determining, from the subscriber profile and the time of day of the call,whether one of the calling party and the called party is designated to pay for the call.

3. The method of claim 1, wherein the subscriber profile includes a designation of those times of day during which the subscriber designates one of itself and the calling party as the party responsible for paying for the call.

4. The method of claim 1, further comprising completing the call if the subscriber has elected to pay for the call.

5. The method of claim 1, further comprising notifying the calling party that they must accept responsibility for payment for the call before the call is completed, if the subscriber has elected not to pay for the call.

6. The method of claim 5, further comprising completing the call if the calling party agrees to pay for the call.

7. The method of claim 5, further comprising terminating the call if the calling party does not agree to pay for the call.

8. The method of claim 5, further comprising identifying a method of payment of the calling party if the calling party agrees to pay for the call.

* * * * *